United States Patent [19]

Leach et al.

[11] Patent Number: 5,089,076
[45] Date of Patent: Feb. 18, 1992

[54] METHOD OF MANUFACTURING ARTICLE INCLUDING MELTING THERMOSETTING-POWDER

[75] Inventors: Roger J. Leach, East Molesey; James F. Lindsay, Tamworth, both of England

[73] Assignees: Chelsea Artisans PLC, Surrey; Imperial Chemical Industries PLC, London, both of England

[21] Appl. No.: 217,230

[22] Filed: Jul. 11, 1988

[30] Foreign Application Priority Data

Jul. 10, 1987 [GB] United Kingdom ............... 8716242
Jun. 30, 1988 [GB] United Kingdom ............... 8815638

[51] Int. Cl.⁵ .......................................... B29C 65/02
[52] U.S. Cl. .................................. 156/283; 156/99; 156/100; 156/307.3; 156/307.7; 156/314; 156/320; 156/322
[58] Field of Search ............. 156/99, 100, 283, 307.1, 156/307.3, 307.7, 314, 315, 320, 322, 324, 332; 427/195; 428/912.2, 433, 415, 416, 913.3, 430; 350/641, 642, 600; 52/786, 812

[56] References Cited

U.S. PATENT DOCUMENTS

| | | | |
|---|---|---|---|
| 2,468,568 | 4/1949 | McCusker | 156/99 |
| 2,558,848 | 7/1951 | Harrison | 350/642 |
| 2,658,849 | 11/1953 | Lew | 156/332 |
| 2,754,237 | 7/1956 | Brooks | 156/332 |
| 2,807,111 | 9/1957 | Turner | 350/320 |
| 2,890,147 | 6/1959 | Pearson et al. | 156/283 |
| 2,981,651 | 8/1961 | Arnold | 277/235 R |
| 2,995,482 | 8/1961 | Boyce et al. | 156/283 |
| 3,172,797 | 3/1965 | Bungardt | 156/283 |
| 3,207,358 | 9/1965 | Fliss | 427/195 |
| 3,334,008 | 8/1967 | Park et al. | 156/99 |
| 3,580,796 | 5/1971 | Hick | 428/38 |
| 3,784,395 | 1/1974 | McKown | 427/27 |
| 3,912,842 | 10/1975 | Swartz | 428/912.2 |
| 4,054,713 | 10/1977 | Sakaguchi et al. | 156/283 |
| 4,309,484 | 1/1982 | Ohmae et al. | 156/99 |
| 4,382,995 | 5/1983 | Lin | 428/415 |
| 4,465,734 | 8/1984 | Laroche et al. | 52/786 |
| 4,491,389 | 1/1985 | Coburn | 350/642 |
| 4,550,986 | 11/1985 | Leach | 350/641 |
| 4,610,115 | 9/1986 | Thompson | 52/812 |
| 4,824,729 | 4/1989 | Livi | 156/63 |

FOREIGN PATENT DOCUMENTS

| | | | |
|---|---|---|---|
| 0251308 | 5/1964 | Australia | 428/912.2 |
| 0630877 | 11/1961 | Canada | 156/332 |
| 36616 | 9/1981 | European Pat. Off. | |
| 39749 | 11/1981 | European Pat. Off. | |
| 2017723 | 10/1971 | Fed. Rep. of Germany | 156/99 |
| 50-85688 | 7/1975 | Japan | 156/332 |
| 60-23038 | 2/1985 | Japan | 427/195 |
| 0672070 | 7/1979 | U.S.S.R. | 156/100 |
| 0877520 | 9/1961 | United Kingdom | 156/99 |
| 0999821 | 7/1965 | United Kingdom | 427/195 |
| 1024126 | 3/1966 | United Kingdom | 156/283 |
| 1327931 | 8/1973 | United Kingdom . | |
| 1430484 | 3/1976 | United Kingdom . | |
| 1464965 | 2/1977 | United Kingdom . | |
| 2048166 | 12/1980 | United Kingdom | 428/912.2 |
| 2074089 | 10/1981 | United Kingdom | 428/623 |

OTHER PUBLICATIONS

Adhesives Handbook, 1970, pp. 128, 129.
Guttmann, "Concise Guide to Structural Adhesives", 1961, pp. 3, 34, 39, 40, 62, 63, 72, 73, 80, 81, 112, 113, 361, 362, 363, 364.
Dow Corning Bulletin: "Silane Coupling Agents", 1981, pp. 1-13, 156-314.
UK Search Report.

*Primary Examiner*—Michael W. Ball
*Assistant Examiner*—Steven D. Maki
*Attorney, Agent, or Firm*—Cushman, Darby & Cushman

[57] ABSTRACT

Manufacture of an article incorporating a thermosetting-powder surface-coating includes bonding a component to the article to the coating by contacting the melted powder with the component before curing takes place, and maintaining it in contact through curing. In a glass architectural panel, an aluminium foil is bonded in this way to a polyester/triglycidylisocyanurate powder coating on the silane-primed back of the facing glass; the metal foil is backed by a plastics or rubber open-cell material to enhance resistance of the glass to impact, and also, together with the foil, resistance to thermal shock. The coating includes pigmentation to give the effect of colored glass, or is clear to allow the contact-surface of the metal to show through; further decorative effect is obtained by pigmentation variation in the coating and/or partial metallization of the glass back-surface. The technique is also applied to bonding fittings to the powder-coated face of a door; of decals of cured powder-coating material to, or within, powder-coatings; of glass over apertures in metal walls; and of glass to glass in building up a laminate.

19 Claims, 4 Drawing Sheets

METHOD OF MANUFACTURING ARTICLE INCLUDING MELTING THERMOSETTING-POWDER

BACKGROUND OF THE INVENTION

This invention relates to articles that include thermosetting-powder surface-coatings, and especially to methods of their manufacture of the kind in which a thermosetting organic powder-coating material applied to a surface is heated to melt and cure the powder and thereby form a coating bonded to the surface.

Methods of the above-specified kind are known, in particular in connection with the manufacture of panels for doors, partitions and other purposes, in which at least the front surface of a sheet of metal that is to provide the facing sheet of the panel, is coated evenly with an epoxy or other thermosetting organic powder-coating material, and is then stoved to heat the powder to a temperature at which it melts and cures so as to form, on cooling, a hard protective face-coating to the metal sheet. The coating affords protection to the metal, and pigmentation in the powder can be used to give color for decorative effect.

Although manufacturing techniques of this known nature, and the products of such techniques, are widely used, it has been found that they are applicable in even wider contexts than heretofore. It is an object of the present invention to extend their application in this regard.

SUMMARY OF THE INVENTION

According to one aspect of the present invention, there is provided a method of manufacturing an article, of the said above-specified kind, wherein, prior to curing and while the powder is in the melted condition, contact is established between the melted powder and a component that is to be included in the manufactured article, and such contact is maintained during curing so that a bond is formed between the component and the surface via the cured powder coating.

It has been found that with use of the method according to the present invention, a very firm bond of the component with the coating, and thereby with the coated surface, can be achieved. Thus, not only can the advantages of the powder coating be realised for protective and/or decorative effect, but they can be combined with the advantage of the adhesive effect. There is immediate application of the technique where a fitting or furnishing item is to be secured to a surface-coated article; for example, where the manufactured article is a door-panel, a handle and/or other item of door furniture, may be attached to the face-coating of the panel without the need for screws or other fixings, simply by bringing it into contact with the melted powder, and then curing the powder to effect a bond to the door-panel. The technique has application for bonding together items of varying materials, typically: of a metal or plastics item to a metal item, as may be the case in the above example; of a glass item to a metal item, as for example in the provision of a glass window in a metal wall; and of glass items to one another, as for example in the forming a glass laminate. But the invention is of advantage in wider contexts than these.

More especially, it has been found that the invention is of significant advantage in the provision of glass cladding for both exterior and interior architectural purposes. In this respect, the coating is advantageously applied to the back surface of the glass, so that whether the glass is clear or otherwise, pigmentation of the coating is revealed through the glass to give the effect of color in the glass. Where no pigmentation is used, and/or depending on the transparency of the coating, the component bonded to the back of the coating may also contribute to the visual effect in the glass. However, even where coloration or other decorative effect is not sought, particular advantage is obtainable in another respect if the backing component bonded with the coating is of thermally-conductive material, for example aluminium foil, and covers the coating surface to a substantial extent, since such component will then have the effect of tending to equalize temperature across the glass sheet. This facilitates the use of annealed glass in contexts where it would not otherwise be acceptable or possible to use it, in particular for architectural colored-glass cladding.

The glass conventionally used for architectural cladding, is toughened, and this precludes cutting to size, and ease of fitting, on site; toughened glass is used in order to withstand temperature gradients, and also to resist impact without splintering dangerously. Use of annealed glass instead of toughened, would be preferred, since such glass is cheaper and can be cut on site, but annealed glass does not in general withstand temperature gradients and provide adequate resistance to impact, within the normal safety criteria. The present invention makes it possible for this preference to be exercised, in particular because the use of a thermally-conductive sheet as the component bonded to the back of the powder coating applied to the glass, can be effective to reduce temperature gradients across the glass to an extent adequate to allow annealed glass to be used in a wide range of architectural environments. The fact that color or other decorative effect can readily be provided, as referred to above, in such glass, has an additional advantage in this context, since requirement for color or other decorative effect in cladding-glass would normally make use of toughened glass essential.

Thus, according to a feature of the present invention, there is provided a method of manufacturing a panel for architectural or other purpose, in which a thermosetting organic powder-coating material applied to a surface of a facing sheet of the panel, is heated to melt and cure the powder and thereby form a coating bonded to the surface, wherein the facing sheet is of glass, the coating is applied to the back of the glass sheet, contact is established between the melted powder and a surface of a thermally-conductive sheet prior to curing and while the powder is in the melted condition, and such contact is maintained during curing so that the sheet is thereby bonded, as a thermally-conductive backing, with the cured powder coating.

This feature of the present invention is applicable to toughened glass as well as to annealed glass, but, as indicated above, the application to annealed glass has special advantage. Resistance to impact and thermal shock of the glass can be enhanced to a very substantial degree—especially where annealed glass is used—by bonding an open-cell material in the form, for example, of a flexible and compressible foamed plastics or rubber layer, to the backing sheet. A rigid board of, for example, wood or foamed plastics, may be bonded behind this latter layer to give added strength to the panel.

In the method of the present invention as presented generally and specifically above, an adhesion promoter may be used to pre-coat the surface that is to receive application, for example electrostatically, of the powder-coating material. The promoter may be a silane, and in this respect may be applied as a solution of the silane in a blend of water with isopropanol or another alcohol. The silane may be an organosilane ester.

The invention also relates to the articles produced according the methods of the present invention as these methods are referred to in general and specific terms above. More especially, and according to a general aspect of the present invention, there is provided an article of the kind in which a surface of the article carries a coating of cured thermosetting organic powder material, wherein a component of the article is bonded to the coating by the cured powder material.

In the latter respect, the article may be specifically in the form of a door-panel having a powder-coated surface, and in this case the component may be an item of door furniture or other fitting. Furthermore, the surface may be a glass surface, and in this regard the coating may back a glass facing-sheet of a panel for architectural or other purpose, with the coating itself backed by a sheet of thermally-conductive or other material, that is bonded to the coating by the cured powder material.

BRIEF DESCRIPTION OF THE DRAWINGS

Examples of articles and methods of their manufacture in accordance with the present invention, will now be described, with reference to the accompanying drawings, in which.

DETAILED DESCRIPTION

Figure 1:
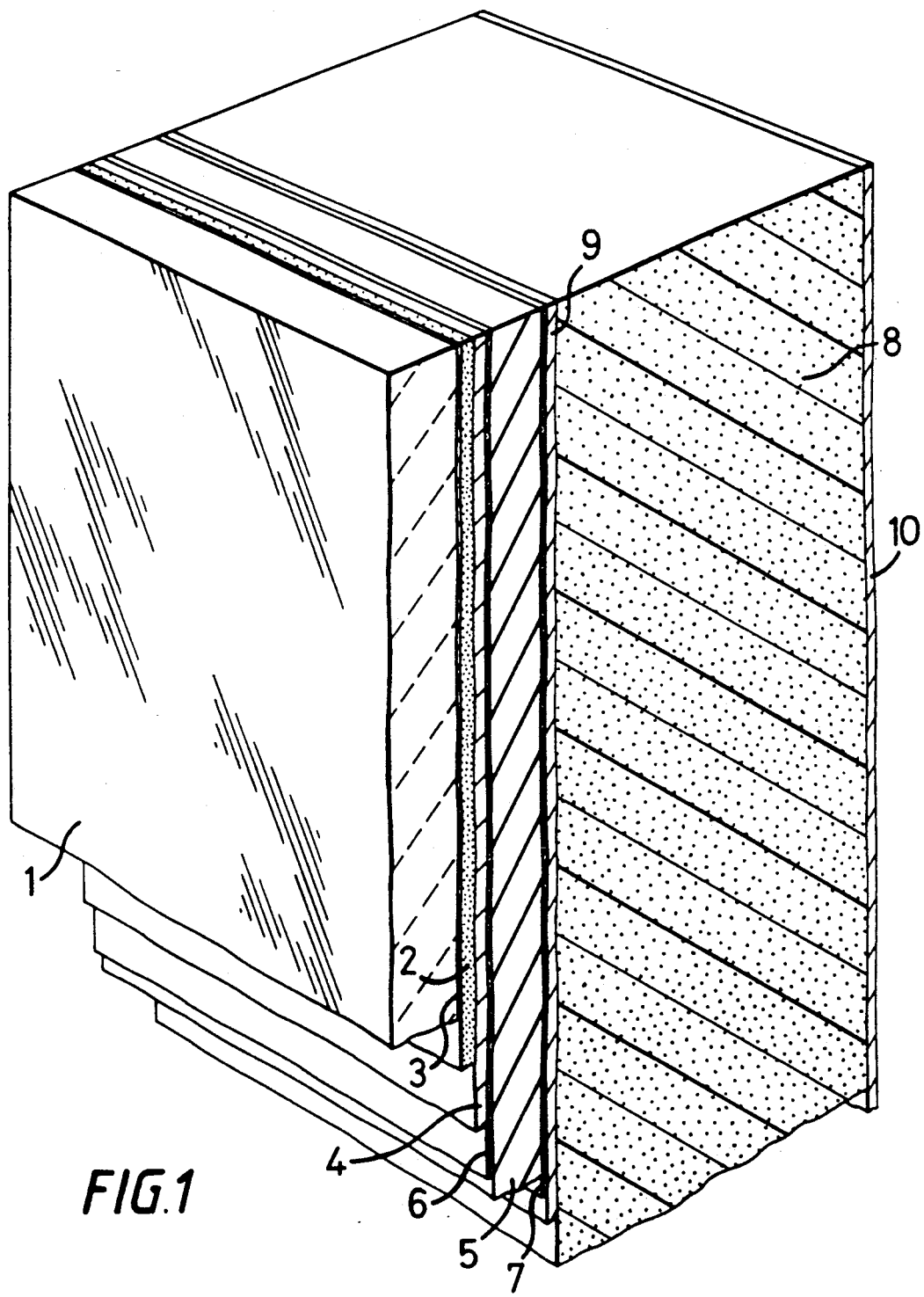
FIG. 1 is a perspective view of part of an architectural panel in accordance with the present invention.

The architectural panel to be described with reference to FIG. 1, is of a form suitable for use in providing glass cladding to exterior or interior walls of buildings. For this application, the panel is rectangular with glass-face dimensions of some 3×1.2 metres, and an overall thickness of some twenty-eight millimetres; clearly panels of larger or smaller dimensions can be provided.

Referring to FIG. 1, the panel is faced by a sheet 1 of clear, annealed glass having a thickness of 4 millimetres. The glass sheet 1 is backed by a cured polyester powder-coating 2 bonded to the sheet 1 via an interlayer 3 of silane adhesion-promoter. The interlayer 3 is very thin (perhaps only one molecule thick), and the coating 2, which has a thickness in the range from 60 to 120 microns, contains a pigment to show color in the glass facing and give the visual effect of colored glass to the cladding panel.

The coating 2 has a backing of aluminium foil 4 that is bonded to the sheet 1 via the coating 2 in the process of stoving the polyester powder-coating 2 on the glass sheet 1. The foil 4 has a nominal thickness of 0.1 millimetre, and being of good thermal conductivity, serves to equalize temperature variations across the panel. The function of the foil 4 in this latter regard is important in the context of the use of annealed glass, which is less resistant to temperature gradients than toughened glass, especially in exterior applications where part of the panel may be in sunlight and part in shadow. However, the foil 4 also has a protective function in relation to the general porosity of the coating 2, the foil 4 in this regard protecting the coating 2 against degradation from moisture and weathering generally; the nature of the intimate bond obtained according to the invention, between the coating 2 and the foil 4, without the need for introduction of an adhesive interlayer between them, is especially advantageous.

Even to the limited extent that the panel of FIG. 1 has so far been described, it is capable of being used for cladding purposes, whether in the form of large sheets as described, or smaller tiles. In particular, the use of annealed glass enables the panel to be readily cut to size on site, but the usefulness of the panel, in particular its capability of resisting impact and thermal shock, is greatly enhanced by the addition, as illustrated in FIG. 1, of an element 5 of flexible and compressible open-celled foamed plastics or rubber material, bonded to the back of the aluminium foil 4. The element 5 is in the form of a layer of some 3 millimetres in thickness, and has both faces covered by layers 6 and 7 of finely-woven or knitted nylon mesh that has been flame-welded to the layer 5; the mesh serves to stabilize the layer during its bonding into the panel. A rigid board 8 of foamed polyurethane and/or polyisocyanurate or phenolic resin, faced with sheets 9 and 10 of aluminized paper or glass fibre, is bonded to the element 5 via the facing layer 7, to add rigidity and further damage-protection to the panel without detracting from the ease of cutting and fitting on site.

As indicated above, the foil 4 has a significant effect in equalizing temperature variations across the panel, as well as providing protection for the coating 2. Incorporation of the open-cell element 5 into the panel to back the foil 4, not only significantly enhances the resistance of the glass to impact, but also adds further to its ability to withstand temperature differential between adjacent areas of the glass. The open-cell structure tends to promote the dispersion of heat across the glass, and thereby tends to reduce temperature gradients, by retarding movement of hot gas away from the foil 4 and enhancement of its movement across the back of the panel.

Tests with annealed glass have indicated that the capacity of the glass to withstand temperature differential was increased by some 80 to 90 degrees Celsius when provided with the coating 2 and its foil 4 backed by the element 5. Furthermore, such tests have shown that as well as greatly increasing impact resistance of the glass, the construction reduces significantly the extent of splintering when the glass does eventually break.

Figure 2:
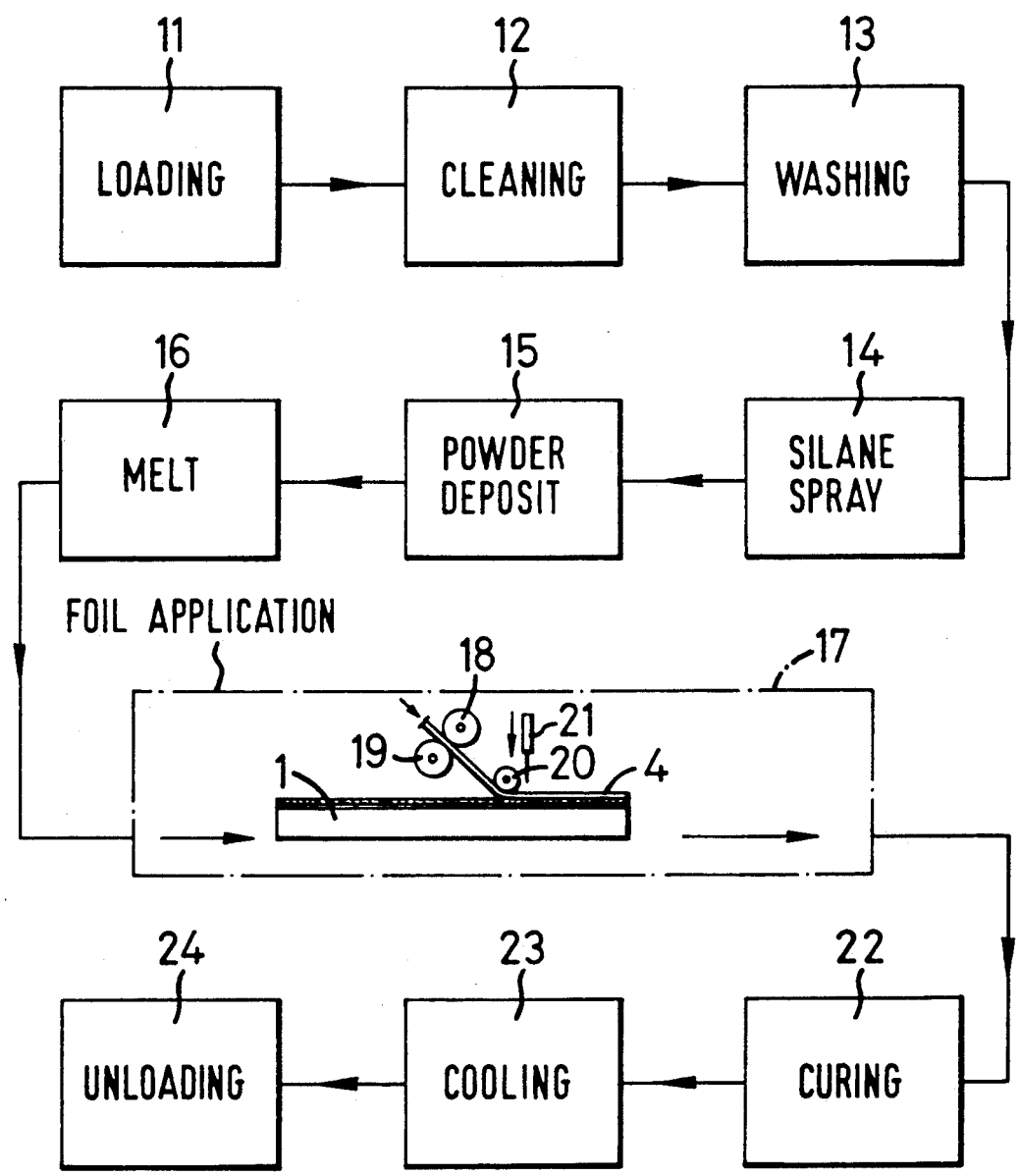
FIG. 2 is a schematic representation of part of a production line for manufacturing the architectural panel of FIG. 1 using a method according to the present invention.

The method of manufacturing the panel will now be described with reference to FIG. 2, which illustrates part of a production line for manufacturing panels of the form shown in FIG. 1, in a continuous process. The manufacturing process will be described, and the production line is illustrated in FIG. 2, only up to the stage at which the glass sheet 1 has been provided with the cured coating 2 and its aluminium foil-backing. The addition of the layer-element 5 and board 8, is carried out in essentially the same manner as the provision of like layers and boards for mirrors, described in UK Patent No 2,048,166, and will not be described here.

Referring to FIG. 2, the sheet 1 of glass is loaded face down on a conveyor at the first station 11 of the production line, and is transferred by the conveyor to a cleaning station 12 where all loose debris is removed from both faces of the sheet 1 by means of a vacuum cleaner. The sheet 1 then passes on the conveyor through a washing station 13 where its upper, back, surface is sprayed with a solution of isopropanol and distilled water, and scrubbed by rotating brushes to remove all dirt, before being wiped or air-blown dry of excess solution.

From the washing station 13, the glass sheet 1 passes into a spray station 14 where the upper surface of the sheet 1 is sprayed with a fine mist of a solution of silane in a blend of isopropanol and distilled water. As the sheet 1 leaves the station 14, warm air is directed at the glass to dry the glass surface and leave it coated with the thin interlayer 3 of silane, before the sheet 1 passes to the next, powder-deposit station 15.

The station 15 includes provision for electrostatic or tribostatic deposition of polyester powder-coating material on the silane-coated upper surface of the sheet 1. The powder, which is the milled product of extruding a melted mixture of a polyester resin, cross-linking agents and pigments, is deposited on the upper surface of the sheet 1 evenly, and to a depth within the range 60 to 120 microns, by regulating the uniformity and speed of progress of the sheet 1 through the station 15. As the sheet 1 leaves the station 15, the lower, front face of the glass is brush- and vacuum-cleaned to ensure that none of the powder remains on this face.

The sheet 1 now enters a melt station 16 where infra-red heaters maintain a temperature in the range 150 to 170 degrees Celsius, so as to melt the powder. The heat is applied uniformly across the whole body of powder for a period of some two minutes before the sheet 1 moves to a foil-application station 17 for receiving the sheet of aluminium foil 4. In this regard, foil is dispensed from a supply roll (not shown) onto the melted powder via heated silicone-coated rollers 18 and 19; the heating of the rollers 18 and 19 is sufficient to avoid any condensation on the foil. The sheet 1 is stopped momentarily as the leading edge of the foil is brought down onto the leading edge of the melt under a roller 20, and is then carried forward with the foil pressed downwardly by the roller 20 into surface contact with the layer of melted powder. The downward pressure is maintained as the foil is fed at an angle onto the moving melt-surface under the roller 20, so as to ensure that air which would otherwise be entrapped under the foil, is squeezed out. When the whole of the melt is covered, the sheet 1 stops momentarily again to allow a flying knife 21 to cut the foil at the trailing edge. This divides off from the supply web the element of foil, namely the foil 4, that now lies in full surface contact with the body of melted powder, and enables the sheet 1 to move out of the station 17 into a curing station 22.

The air temperature within the curing station 22 lies within the range of 210 to 230 degrees Celsius, so as to raise the temperature of the assembly of sheet 1, melted powder and foil 4, to some 200 degrees Celsius. The assembly is maintained at this level of temperature for ten minutes, in order to cure the powder and effect the bonding to the sheet 1 and foil 4. After this, the sheet 1 with its cured coating 2 and adhering foil 4, pass into a cooling station 23 and thence to an unloading station 24 for subsequent attachment of the backing element 5 and board 8, as required.

It has been found that the cured powder-coating 2 provides not only good coloration (according to the particular pigmentation used in the powder) for the visual effect in the glass, but also a strong bonding between the glass and the foil 4. Moreover, the manufacturing method described, has been found to result in a product which is free from air bubbles and ripples between the glass and coating, and between the coating and foil 4, and for which the color-view in the glass is uniform and without blemish, across the full area of the front face of the panel. Reduction in the possibility of air or other gas bubbles affecting the coating can be achieved if the melting and curing stages of the method are carried out in a reduced-pressure or partial-vacuum atmosphere.

The particular powder-coating material preferred for use in the context of the panel described above, is a polyester resin containing a catalyst agent with a triglycidyl isocyanurate curing agent; the powders sold as PPL858G and PPH857G under the trade mark DURAPLAST by Holden Surface Coatings Ltd. of Birmingham, England, are appropriate in this respect. Such powders provide structures that not only have good bonding, but have also been found to be markedly resistant to the effects of humidity and of salt, sulphur dioxide and other pollutants in the atmosphere, and to sunlight.

Although the polyester/triglycidyl-isocyanurate powders have been found advantageous in the above context, other polyester powders, and epoxy-, acrylic- and polyurethane-based powders, may be applicable in appropriate circumstances. Powders combining a polyester resin with an epoxy curing agent have, in particular, been found to provide acceptable results.

The use of an adhesion promoter on the glass is desirable to facilitate a good bond with the powder coating; as indicated above, a silane has been used for this purpose. More especially, it has been found that an organosilane ester facilitates good bonding when applied in a solution containing 3 per cent by volume of the silane in a blend of isopropanol and distilled water for which the ratio of isopropanol to water is 4:1 by volume. Gamma-mercaptopropyltrimethoxysilane has been found especially effective when used in this way; the product sold under the Trade Mark UNION CARBIDE as Organofunctional Silane A-189 by Union Carbide Corporation is appropriate in this respect.

The foil used to back the powder coating is preferably an aluminium-alloy foil of hard temper that has been pre-treated by the rinse method with a mixed aluminium phosphate and chromium III phosphate primer. The use of a hard temper facilitates easy and clean cutting of the panel.

Various decorative effects beyond uniform coloration, can be readily obtained with a glass-faced panel constructed in the general manner described with reference to FIG. 1. In particular, a combined mirror and color effect can be achieved by sputtering or otherwise depositing a thin layer of metal on part or parts of the back surface of the glass prior to coating it with powder (for example, prior to entry into station 14 of the production line illustrated in FIG. 2); the metallized part or parts give a mirror effect with the pigmentation of the cured powder-coating showing in the glass elsewhere. Alternatively or in addition, different pigmentations may be used in different areas, simply by depositing the differently-pigmented powders on the back surface of the glass where required (for example, within station 15 of the production line illustrated in FIG. 2); there is minimal diffusion of pigmentation across the interface between powders during the melt and curing phases. Either (or both) of these techniques may be applied, for example, to the provision of distinctive lettering or other symbology in the glass, as will now be described with reference to FIG. 3 which illustrates the letter T as this is both delineated on part of the back surface of the glass and is visible in the glass from the front.

Figure 3:
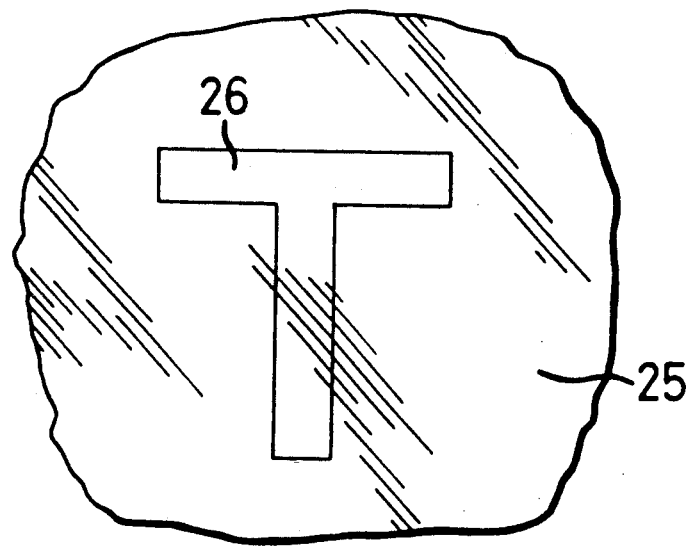
FIG. 3 is illustrative of modification of the panel of FIG. 1.

Referring to FIG. 3, metal is sputtered on the back surface of the glass throughout a region 25 which surrounds an area 26 that is free of metallization and delineates the letter T; alternatively, the metal may be sputtered onto the glass throughout the area 26 leaving the region 25 clear. In the first case, the view from the front of the panel will show the letter T in color against a mirror background, where the powder-coating on the back surface shows through the area 26, whereas in the second case, the letter T will appear in mirror form against the color background of the region 25.

The delineation of the letter T in the case of FIG. 3, may, instead, be carried out at the powder-deposition stage of production by first depositing a powder of one pigmentation to cover the region 25 or the area 26, and then a powder of another pigmentation to cover the other; stencils may be used for achieving the required delineation of the different powders. The letter T will then be seen in distinctive color against a colored background in the finished panel.

Color and other decorative effect in the glass need not be dependent wholly or partially on pigmentation of the powder coating. In particular, the pigment may be omitted from the coating powder in the panel of FIG. 1, so as to result in a substantially transparent coating 2 which exposes the foil 4 to view from the front of the glass sheet 1. Thus color and/or other decorative effect in the glass is realised in this case by what is visible on the bonded surface of the foil 4; this surface is readily colored and/or otherwise decorated (for example, prior to supply to the foil-application station 17 of the production line of FIG. 2), and use of this technique is of significantly wide potential application. Where the bonded surface is polished, a mirror effect is achieved, and any color of that surface is then incorporated into the mirror.

Figure 4:
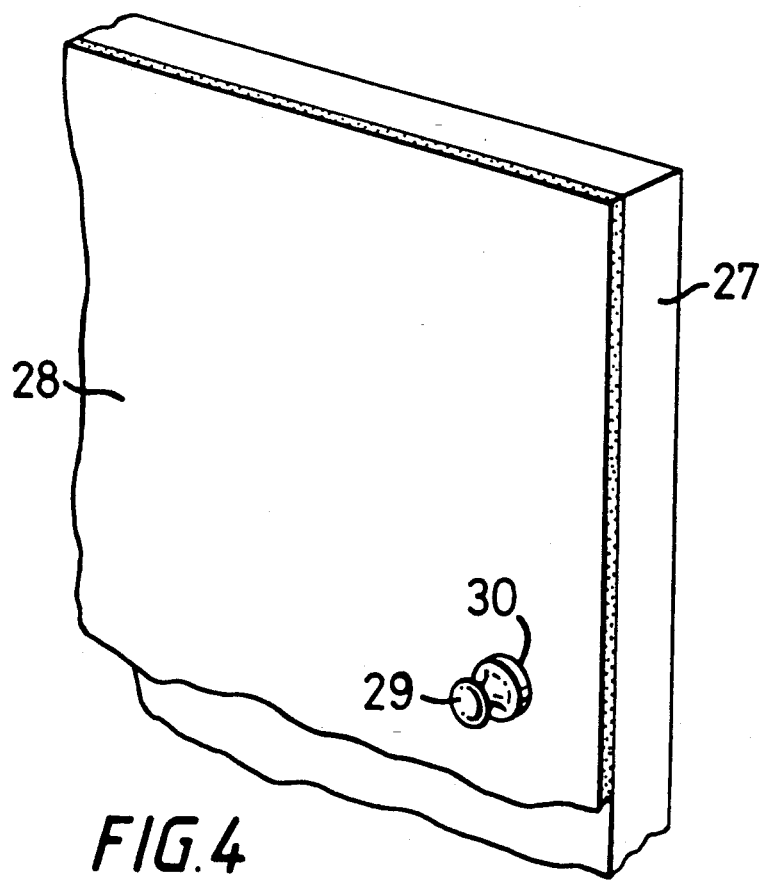
FIG. 4 is a side elevation of part of a door-panel that in both structure and method of manufacture, is in accordance with the present invention.

The present invention, although particularly advantageous in the context of the provision of glass-faced panels for architectural or other purposes, is not limited to this context; an example of its wider application is illustrated, for example, in FIG. 4, which shows part of a metal door-panel that is powder coated on its front, external face.

Referring to FIG. 4, the panel consists of a steel sheet 27 faced with a powder-coating 28, and having a handle 29 of the door with its base 30 bonded to the sheet 27 via the coating 28. The coating 28 is a cured powder containing an epoxy or other resin together with cross-linking agents and pigments.

Manufacture of the door-panel of FIG. 4 is carried out by first depositing the powder on the front surface of the sheet 27; an adhesion promoter may possibly be applied to the surface beforehand. The sheet 27 is heated to melt the powder, the base 30 of the handle 29 is brought into surface contact with the melt, and then, with the contact between the melt and base 30 maintained, the whole assembly is heated to a higher temperature to cure the powder coating. A bond is in this way firmly established between the handle 29 and the coating 28 as well as between the coating 28 and the sheet 27. The coating 28 not only provides a protective and decorative facing, but enables the door furniture to be secured without, in general, the need for screws or other fixings.

Figure 5:
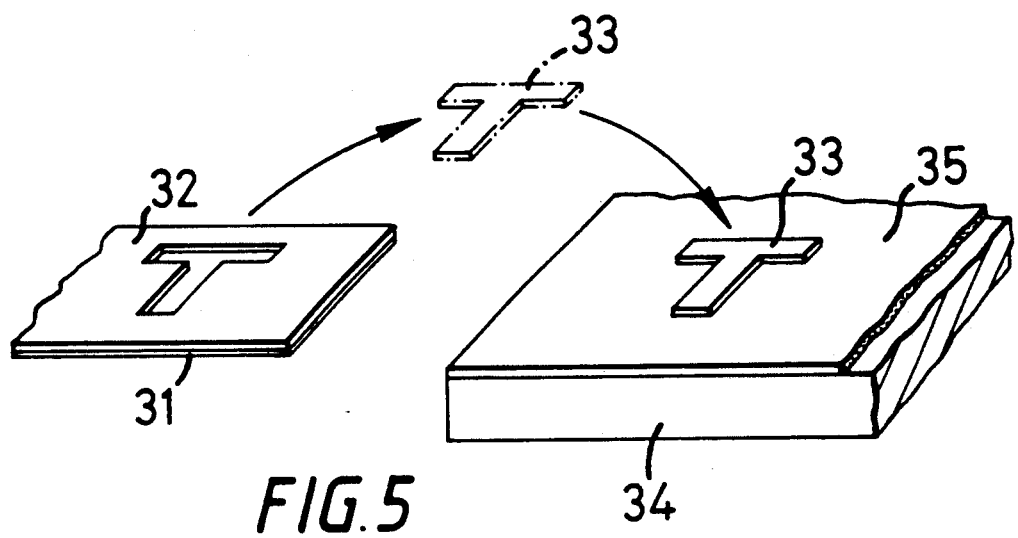
FIG. 5 illustrates another method of manufacture according to the present invention.

The method of the invention is also applicable according to a further example, to the formation and application of decals to a coated article. In particular, as illustrated in FIG. 5, the decals themselves, may be of thermosetting powder-coating material. FIG. 5 illustrates the manner in which a decal in the shape of the letter T is derived and transferred to become part of the finished article.

Referring to FIG. 5, a thermosetting organic coating-powder, for example of an epoxy or polyester resin, is first laid down on a substrate 31 and is then cured to form a coating 32. The substrate 31, for example of polytetrafluorethylene, is chosen (or is otherwise treated) to be such that the coating 32 readily strips from it, and in particular such that an element 33 having a desired shape—which in the illustrated case is that of the letter T—can be cut from the coating 32 and removed. The element 33 is now used to provide the letter T as a decal on the upper face of a base member 34 of metal, glass or other material.

In the latter respect, the base member 34, after being treated with an adhesion promoter if necessary, is coated with a thermosetting organic coating-powder; this may be the same as that used for the coating 32 but with different pigmentation. The member 34 is now heated to melt the powder, and the element 33 is then applied to the melt in the location appropriate for the decal on the base member 34. Finally, after curing the powder, the whole is allowed to cool, leaving the element 33 firmly bonded in place on the now-formed coating of the base member 34.

The technique described with reference to FIG. 5 has advantage in that the decal element 33 is firmly secured to the coated member 34 without the use of any adhesive, and resists attack by weather and wear. Also, a very distinctive effect can be obtained simply by using different pigments in the powders of coatings 32 and 35.

Where clear glass is used as the base member 34, the technique described with reference to FIG. 5 may be modified to provide for viewing of the decal through the glass. The element 33 is in this case placed on the upper surface of the glass and the uncovered areas of that surface then treated with silane before the powder is applied over those areas and the element 33. Heating melts the powder and brings about full contact between it and the element 33, so that after further heating to cure the powder and subsequent cooling, the element remains firmly bonded in the coating.

Figure 6:
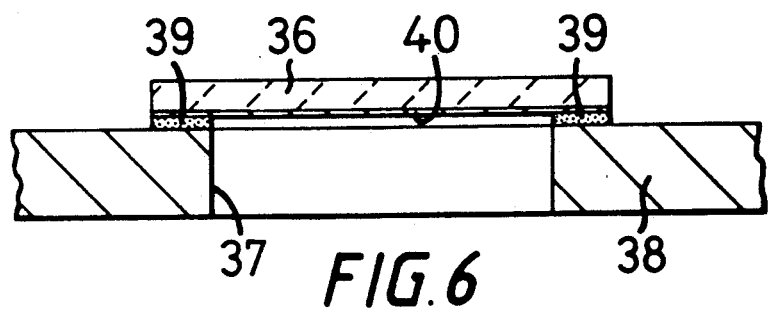
FIGS. 6 and 7 are sectional side-views of further articles that in both structure and method of manufacture, are in accordance with the present invention.
Figure 7:
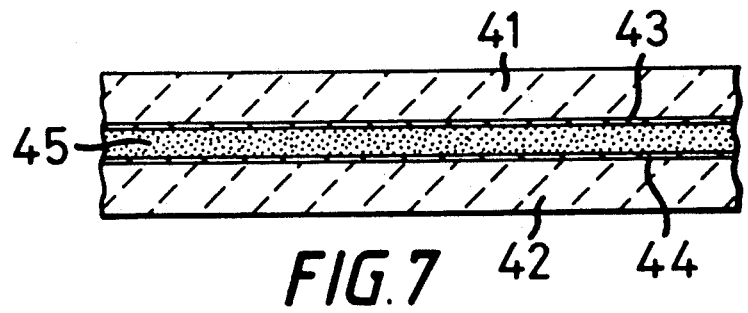

The method of the present invention may be applied as illustrated in FIGS. 6 and 7, to the bonding of glass over an aperture in a metal wall, and to the formation of a glass laminate, respectively.

Referring to FIG. 6, a glass sheet 36 is located over an aperture 37 in a metal wall 38, the sheet being bonded to the wall 38 by cured powder-coating material 39; the coating 39 is shown confined to the margin of the aperture 37, but clearly it could extend across the whole of the wall face. In manufacture of this article, the contacting face of the sheet 36 is initially provided with a coat 40 of a silane adhesion-promoter, and an epoxy or other coating powder is applied around (at least) the margin of the aperture 37 of the wall 38. The powder is now heated to the melt phase, and the glass sheet 36 is placed over the aperture 37, silane-coated face down, into surface contact with the melt around the aperture margin. The sheet 36 is retained in this condition while the assembly is heated further to cure the powder and form the coating 39 bonding the glass sheet 36 to the wall 38, over the aperture 37.

In the example of FIG. 7, two glass sheets 41 and 42, which have coats 43 and 44 respectively, of a silane adhesion promoter, are bonded together as a laminate by means of a polyester or other powder coating 45. Such a laminate is applicable, for example, where color but opacity, or at least translucency, is required with glass facing on both sides of the laminate. Manufacture is carried out by applying the powder for the coating 45 to the silane-prepared face of one of the sheets 41 and 42, melting the powder, contacting the melt across the whole area with the silane-prepared face of the other sheet, and maintaining such contact while the powder is cured. The likelihood of entrapping gas in the laminate can be reduced, by carrying out the steps of establishing contact of the glass with the melt, and also curing the powder, within a reduced-pressure atmosphere.

The thermosetting organic powder-coating materials that are suitable for use in the various embodiments of the invention described above, include polyester, epoxy-, acrylic- and polyurethane-based powders. Such powders may include, as well as pigments where appropriate extenders in the form of mineral fillers, and flow modifiers.

The use of polyester/triglycidyl-isocyanurate powders has been described in the context of the embodiment of FIG. 1, but as an alternative, a polyester resin with an epoxy curing agent may be used. The catalyst included may be typically choline chloride, stannous octoate, or tetrabutylammoniumbromide to a level typically from 0 to 0.2 per cent. Furthermore, an epoxy resin with a dicyandiamide curing agent may be used. All such powders may find application in the other embodiments described.

As regards adhesion promoter, the use of a silane, and in particular gamma-mercaptopropyltrimethoxysilane, is referred to in connection with the embodiment of FIG. 1. As an alternative, gamma-aminopropyltriethoxysilane may be used, and these adhesion promoters are also applicable in the other embodiments described.

We claim:

1. In a method of manufacturing a panel for architectural purposes, in which a thermosetting organic powder-coating material applied to a surface of a facing sheet of the panel in the form of powder, is heated to melt and cure the powder and thereby form a coating bonded to the surface, the improvement wherein the facing sheet is a sheet consisting of glass having planar front and back surfaces, the powder is applied to the back surface of the glass sheet, contact is established between the melted powder and a surface of a metal sheet prior to curing and while the powder is in the melted condition, and such contact is maintained during curing so that said metal sheet is thereby bonded, as a thermally-conductive backing, by the cured powder coating to said back surface of the glass sheet, the thermosetting material being clear so that at least part of the coating-bonded surface of the backing sheet is viewable in the glass when viewing into said front surface of the glass sheet, through the coating.

2. A method according to claim 1 wherein said back surface of the glass sheet is coated with an adhesion promoter prior to application of the powder-coating material.

3. A method according to claim 2 wherein the adhesion promoter is a silane.

4. A method according to claim 3 wherein the silane is applied in solution with an alcohol-water blend.

5. A method according to claim 4 wherein the silane is an organosilane ester.

6. A method according to claim 1 wherein said thermosetting material includes pigmentation to give a visual effect of color in the glass when viewing into said front surface of the glass sheet.

7. A method according to claim 1 wherein the thermosetting material includes a polyester resin.

8. A method according to claim 1 wherein the thermosetting material contains a catalyst agent with a triglycidyl-isocyanurate curing agent.

9. In a method of manufacturing a panel for architectural purpose, in which a thermosetting organic powder-coating material applied to a surface of a facing sheet of the panel, is heated to melt and cure the powder and thereby form a coating bonded to the surface, the improvement wherein the facing sheet is of glass, the coating is applied to the back of the glass sheet, contact is established between the melted powder and a surface of a thermally-conductive sheet prior to curing and while the powder is in the melted condition, and such contact is maintained during curing so that said thermally-conductive sheet is thereby bonded, as a thermally-conductive backing, with the cured powder coating, and wherein the step of applying the powder-coating material involves the application of powder-coating materials having different pigmentations to different locations of the glass surface, such as to give the effect of different colors in different parts of the glass.

10. A method of manufacturing a glass-cladding panel, comprising the steps of providing a sheet element consisting of glass, said element having a front surface and a back surface, depositing a thermosetting organic powder-coating material in the form of powder on said back surface of said element, heating the element and the powder to melt the powder but not to cure it, placing a surface of a metal foil in surface-to-surface contact with the melted powder, and then curing the powder while maintaining said surface-to-surface contact of said foil with the melted powder so that said foil is thereby bonded, as a backing and via the cured powder alone, to said back surface of the sheet element, the thermosetting material being clear so that at least part of the bonded surface of the foil backing is viewable in the glass when viewing into said front surface of the glass sheet element, through the coating.

11. A method according to claim 10 wherein the foil is an aluminum-alloy foil having a thickness of substantially 0.1 millimeter.

12. A method according to claim 10 wherein the foil is treated with a primer before being brought into surface-to-surface contact with the melted powder.

13. A method according to claim 10 wherein the powder is of polyester resin containing a catalyst and a triglycidyl isocyanurate curing agent.

14. A method according to claim 10 wherein the powder is of polyester resin having an epoxy curing agent.

15. A method according to claim 10 wherein the powder contains pigmentation to color the cured powder whereby such color shows through the sheet-glass element when viewing into said front surface of the manufactured panel.

16. A method of manufacturing a glass-cladding panel, comprising the steps of providing a sheet element of glass, said element having a front surface and a back surface, metallizing a first part of said back surface of the sheet element thereafter depositing a thermosetting organic powder-coating material in the form of powder on a second part of said back surface of the sheet element, heating the element and the powder to melt the powder but not to cure it, placing a surface of a metal foil in surface-to-surface contact with the melted powder, and then curing the powder while maintaining said surface-to-surface contact of said foil with the melted powder so that said foil is thereby bonded, as a backing and via the cured powder alone, to said back surface of the sheet element, the thermosetting material being clear so that at least part of the coating-bonded surface of the metal foil is viewable in the glass when viewing into said front surface of the glass element, through the coating.

17. A method of manufacturing a glass-cladding panel, comprising the steps of providing a sheet element consisting of glass, said element having a front surface and a back surface, depositing a thermosetting organic powder-coating material in the form of powder on said back surface of said element, heating the element and the powder to melt the powder but not to cure it, placing a surface of a metal foil in surface-to-surface contact with the melted powder, and then curing the powder while maintaining said surface-to-surface contact of said foil with the melted powder so that said foil is thereby bonded, as a backing and via the cured powder alone, to said back surface of the sheet element, wherein the step of depositing the powder-coating material comprises depositing a thermosetting powder containing a first color pigmentation on a first part of said back surface of the sheet element, and depositing a thermosetting powder containing a second color pigmentation on a second part of said back surface of the sheet element.

18. A method of manufacturing a glass-cladding panel, comprising the steps of providing a sheet element consisting of glass, said element having a front surface and a back surface, depositing a thermosetting organic powder-coating material in the form of powder on said back surface of said element, heating the element and the powder to melt the powder but not to cure it, placing a surface of a metal foil in surface-to-surface contact with the melted powder, and then curing the powder while maintaining said surface-to-surface contact of said foil with the melted powder so that said foil is thereby bonded, as a backing and via the cured powder alone, to said back surface of the sheet element, wherein the powder is deposited on said back surface of the sheet element to a depth substantially within the range of 60 to 120 microns, the thermosetting material being clear so that at least part of the coating-bonded surface of the metal foil is viewable in the glass when viewing into said front surface of the glass sheet element, through the coating.

19. A method of manufacturing an article in which a bond of substantially uniform thickness is established between two surfaces, one of which is a back surface of a monolithic sheet of glass and the other of which is a surface of a flexible metal foil that is substantially thinner than said monolithic sheet, the method comprising a first step of applying a thermosetting organic powder-coating material to a first of said two surfaces, said first step including distributing the material in powder form on said first surface to a depth substantially within the range 60 to 120 microns, and a second step of heating the powder-coating material applied to said first surface to melt and cure the powder-coating material and thereby form a coating bonded to said first surface, said second step including, prior to curing and while the powder-coating material is in the melted condition, contacting the melted powder-coating material with said second surface and maintaining such contact during curing so that said bond is formed between the metal foil and said monolithic sheet via the cured powder coating, the thermosetting material being clear so that at least part of the coating-bonded surface of the metal foil is viewable in the glass when viewing into a front surface of the monolithic sheet, through the coating.

* * * * *